US 6,644,264 B2

(12) United States Patent
Shoemaker

(10) Patent No.: US 6,644,264 B2
(45) Date of Patent: Nov. 11, 2003

(54) VERTICAL SHAFT INTERNAL COMBUSTION ENGINE WITH OVERHEAD POWER TAKE-OFF

(75) Inventor: Richard W. Shoemaker, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 10/011,632

(22) Filed: Oct. 22, 2001

(65) Prior Publication Data
US 2003/0075139 A1 Apr. 24, 2003

(51) Int. Cl.[7] ............................................. F01M 11/00
(52) U.S. Cl. .................................................... 123/198 R
(58) Field of Search ........................................ 123/198 R

(56) References Cited

U.S. PATENT DOCUMENTS

| | | | |
|---|---|---|---|
| 3,204,619 A | * | 9/1965 | Rubinowitz et al. ..... 123/198 R |
| 3,608,290 A | | 9/1971 | Robinson |
| 3,668,845 A | | 6/1972 | Parker |
| 3,690,384 A | | 9/1972 | Patterson |
| 3,721,077 A | | 3/1973 | van der Lelv |
| 3,812,917 A | | 5/1974 | Strate |
| 3,945,176 A | | 3/1976 | Vicendese et al. |
| 3,979,827 A | | 9/1976 | Anzur |
| 3,984,893 A | | 10/1976 | Ashley |
| 4,095,922 A | * | 6/1978 | Farr ....................... 123/198 R |
| 4,304,141 A | | 12/1981 | Tone et al. |
| 4,354,341 A | | 10/1982 | Hathaway |
| 4,366,877 A | | 1/1983 | Vissers et al. |
| 4,446,679 A | | 5/1984 | Thomas |
| 4,478,028 A | | 10/1984 | Dawson, Jr. |
| 4,528,805 A | | 7/1985 | Zitta |
| 4,580,534 A | * | 4/1986 | Blum et al. ............. 123/198 R |
| 4,597,203 A | | 7/1986 | Middleton |
| 4,718,221 A | | 1/1988 | Wessel et al. |
| 4,882,940 A | | 11/1989 | Yamaoka et al. |
| 4,942,725 A | | 7/1990 | Ruder, Sr. |
| 4,965,990 A | | 10/1990 | Slawson, Sr. et al. |
| 5,000,269 A | | 3/1991 | Aoki et al. |
| 5,090,088 A | | 2/1992 | Toth |
| 5,090,142 A | | 2/1992 | Peters |
| 5,187,926 A | | 2/1993 | Rhoads |
| 5,372,106 A | * | 12/1994 | Botterill ................. 123/198 R |
| 5,449,140 A | | 9/1995 | Lastowski |
| 5,497,606 A | | 3/1996 | Baxter |
| 5,704,331 A | * | 1/1998 | Eberbach et al. ....... 123/198 R |
| 5,873,224 A | | 2/1999 | Murakawa et al. |
| 5,983,613 A | | 11/1999 | Winter |
| 6,094,896 A | | 8/2000 | Lane |
| 6,131,380 A | | 10/2000 | Browning |
| 6,145,479 A | | 11/2000 | Rotter |
| 6,155,035 A | | 12/2000 | Merritt, III |
| 6,192,853 B1 | * | 2/2001 | Natsume ................. 123/196 R |
| 6,244,239 B1 | * | 6/2001 | Sisco et al. ............. 123/198 R |
| 6,250,276 B1 | * | 6/2001 | Boll ....................... 123/198 R |
| 6,336,335 B2 | * | 1/2002 | Ota et al. ................ 123/198 R |
| 6,360,712 B1 | * | 3/2002 | Banks et al. ............ 123/198 R |

* cited by examiner

Primary Examiner—Henry C. Yuen
Assistant Examiner—Jason Benton
(74) Attorney, Agent, or Firm—George E. Haas; Quarles & Brady LLP

(57) ABSTRACT

An internal combustion engine includes a crankcase and a crankshaft mounted vertically in the crankcase. The crankshaft has an end that extends outwardly from the bottom of the crankcase for attachment to a primary implement, such as a lawnmower blade, that is to be driven by the engine. Another end of the crankshaft extends outwardly from the top of the crankcase and has a coupling to engage an accessory device. The accessory device may be permanently or removably attached to the engine. Preferably, a cover extends over the top of the crankcase and has an exterior surface from which a well extends toward the crankcase. The coupling projects into the well, but does not extend outwardly beyond the exterior surface of the cover so that the well thereby shields the rotating coupling from inadvertent contact by the user of the equipment on which the engine is mounted. A cap also may close the well when an accessory device is not connected to the coupling to further safeguard against inadvertent contact.

29 Claims, 3 Drawing Sheets

VERTICAL SHAFT INTERNAL COMBUSTION ENGINE WITH OVERHEAD POWER TAKE-OFF

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to internal combustion engines of the type that has a vertical crankshaft, and to mechanisms for coupling accessory devices to be driven by an engine.

2. Description of the Related Art

Many types of power equipment, such as walk-behind and riding lawnmowers, utilize an internal combustion engine which has a vertically oriented crankshaft. Such engines have one or more horizontally aligned piston chambers so that the pistons drive the crankshaft to rotate about a vertical axis. The crankshaft extends from the bottom of the engine where the implement being driven is attached. For example, a pulley or sprocket often is connected to this lower portion of the crankshaft to drive the blades and wheels of a lawnmower. The upper end of the vertical crankshaft typically connects to a flywheel and starter mechanism and does not extend out of the engine housing.

In some power equipment, it is desirable that the engine also power accessory devices, in addition to the primary implements such as the blade and wheels for a lawnmower. Heretofore, the common technique employed by these and other types of power equipment was to drive such accessories from a coupling attached to the bottom end of the engine's crankshaft. For example, U.S. Pat. No. 6,155,035 describes a power take-off which couples the engine of a walk-behind lawnmower to a chipper-shredder placed alongside. U.S. Pat. No. 4,965,990 discloses attachment of an edger assembly to a walk-behind lawnmower. Thus all of the equipment driven by the engine receives power from that same end of the crankshaft.

After an engine has been assembled unto a piece of power equipment, such as a lawnmower, it may be extremely difficult for a user to attach accessories that require power from the engine. The power equipment manufacturer often mounts the engine on the frame of the equipment in such a manner where further access to the lower end of the crankshaft is difficult or impossible. Unless the power equipment manufacturer provides a power take-off coupling, additional accessories often cannot be connected to the engine. Even when a power take-ff coupling is provided, it often requires exposed belts, chains or shafts which present a safety hazard.

Therefore, it is desirable to provide a power take-off coupling on the engine which is easily accessible after the engine has been mounted on a piece of power equipment and wherein the coupling have exposed moving parts.

SUMMARY OF THE INVENTION

An internal combustion engine includes a crankcase and a crankshaft mounted vertically in the crankcase. The crankshaft has a first end that extends outwardly from the bottom of the crankcase for attachment to an implement to be driven by the engine. Another end of the crankshaft extends outwardly from the top of the crankcase and has a coupling to engage an accessory device.

In the preferred embodiment, a cover extends over the top of the crankcase.

The cover has an exterior surface from which a well extends toward the crankcase. The coupling projects into the well, but does not extend outwardly beyond the exterior surface of the cover. The well enables the accessory device to engage the coupling and that be driven by the engine. However the well shields the rotating coupling from inadvertent contact by the user of the equipment on which the engine is mounted. A cap also may close the well when an accessory device is not connected to the coupling to further safeguard against inadvertent contact.

DETAILED DESCRIPTION OF THE INVENTION

Figure 1:
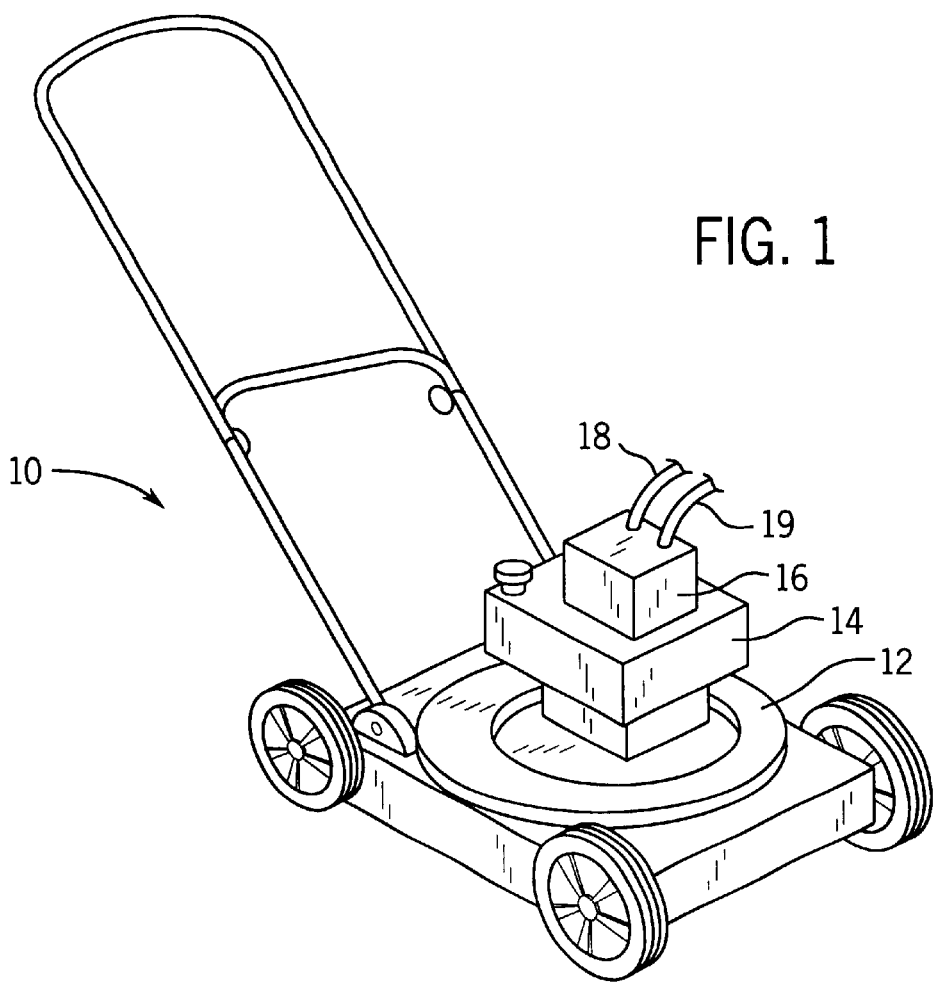
FIG. 1 is an isometric view of a walk-behind lawnmower which incorporates an internal combustion engine according to the present invention.

With initial reference to FIG. 1, a conventional walk-behind lawnmower 10 has a deck 12 to which an internal combustion engine 14 is mounted. The engine 14 is of a vertical crankshaft design wherein the bottom end of the crankshaft extends below the deck 12 of the lawnmower and is attached to the mowing blade. The blade is referred to as the implement of this type of power equipment, as it performs the primary function of the power equipment, mowing the grass. A pulley or other mechanism may be attached to the lower end of the crankshaft to provide power to the wheels of the lawnmower in a conventional manner. Reference herein to the crankshaft being vertical refers to the orientation of the crankshaft when the engine in mounted on a piece of equipment. Although the invention is being described in the context of a walk-behind lawnmower 12, the engine 14 could be mounted on a riding lawnmower or a wide variety of other types of power equipment.

The lawnmower 10 also has an accessory device 16 mounted on top of the engine 14 and receiving power therefrom. In the exemplary embodiment in FIG. 1, the accessory device 16 is a pump which may be part of a pressure washer or an insecticide sprayer. The pump is considered as an accessory device as it is not related to the primary function of the power equipment, mowing the grass. The pump is an example of but one type of accessory device which could benefit from the novel concept of the present invention. It will be understood by those skilled in the art, that any of a number of power accessories could be so mounted, such as an electrical generator, an electric welder, an air compressor or a chipper-shredder. Such power accessories do not have to be permanently mounted on the lawnmower engine, but can be interchangeable by the end user.

Figure 2:
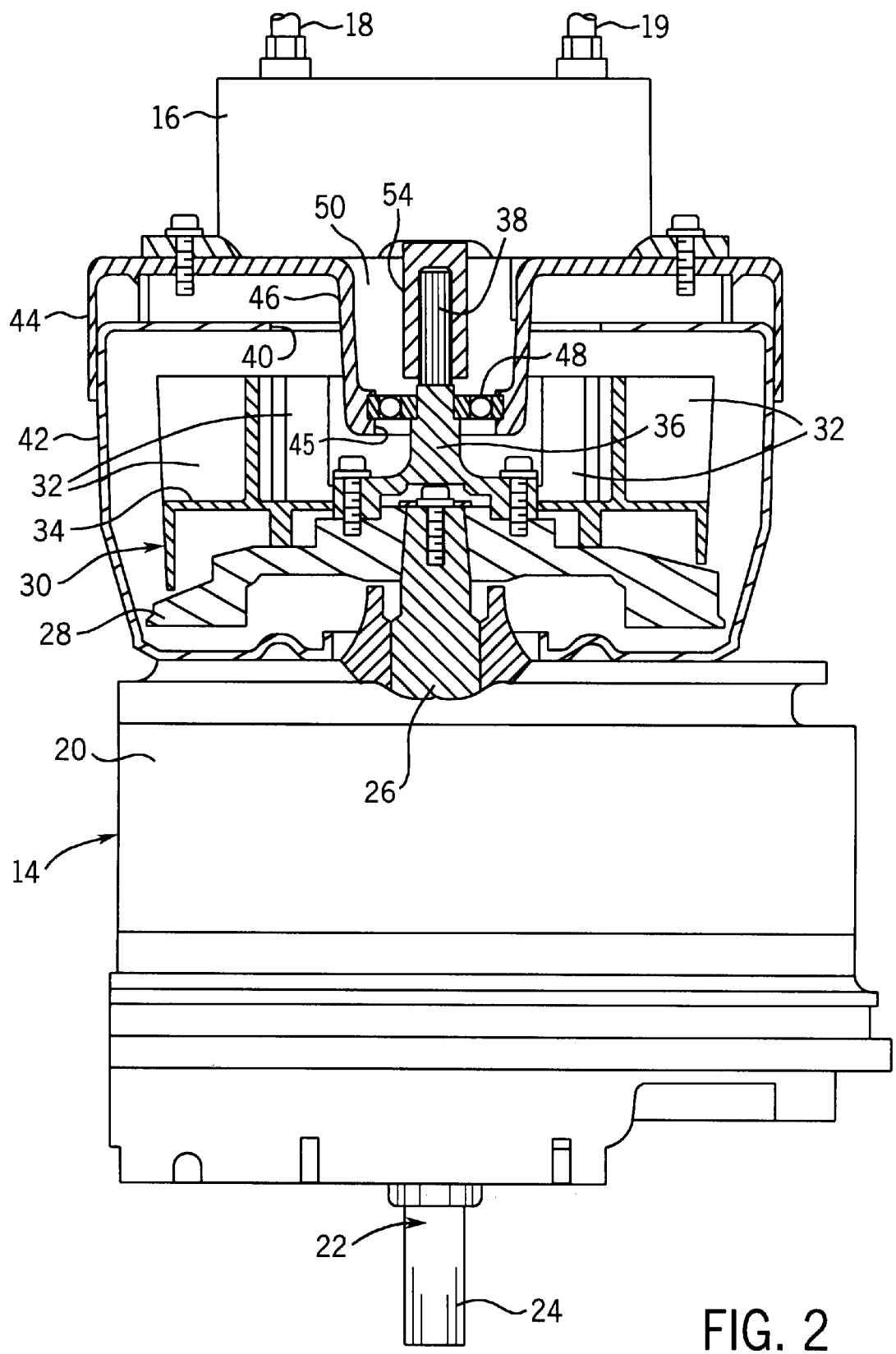
FIG. 2 is a partial cross-sectional view through the internal combustion engine in FIG. 1.

FIG. 2 depicts a partial cross-section view of the engine 14. The engine 14 includes a conventional crankcase 20 with a cylinder bore which receives a piston. A crankshaft 22 extends vertically through the crankcase 20 and has a lower end 24 which projects from the crankcase. When engine 14 is mounted in the deck 12 of the lawnmower 10, the mowing blade attaches to the lower end 24 of the crankshaft 22. Additional components are attached to that end of the crankcase for powering the wheels of a self-propelled lawnmower.

The upper end 26 of the crankshaft 22 extends above the crankcase 20 and is connected to a flywheel 28. A conventional fan with a plurality of blades 32 standing upward from a horizontal plate 34 is coupled to the flywheel 28. A crankshaft coupling 36 is bolted to the flywheel and has a splined shaft 38 which is coaxial with the axis of the crankshaft 22. The splined shaft 38 projects upward through a large opening 40 in an engine housing 42 which extends over the top of the crankcase 20. An adapter cover 44 is mounted on top of the engine housing 42 and has a tubular projection 46 that extends downward through the opening 40 in the engine housing 42 and has an aperture 45 through which the crankshaft coupling shaft 38 extends. A ball bearing 48 in aperture 45 has an outer race that engages the tubular projection 46 and an inner race which engages the crankshaft coupling 36.

Figure 3:
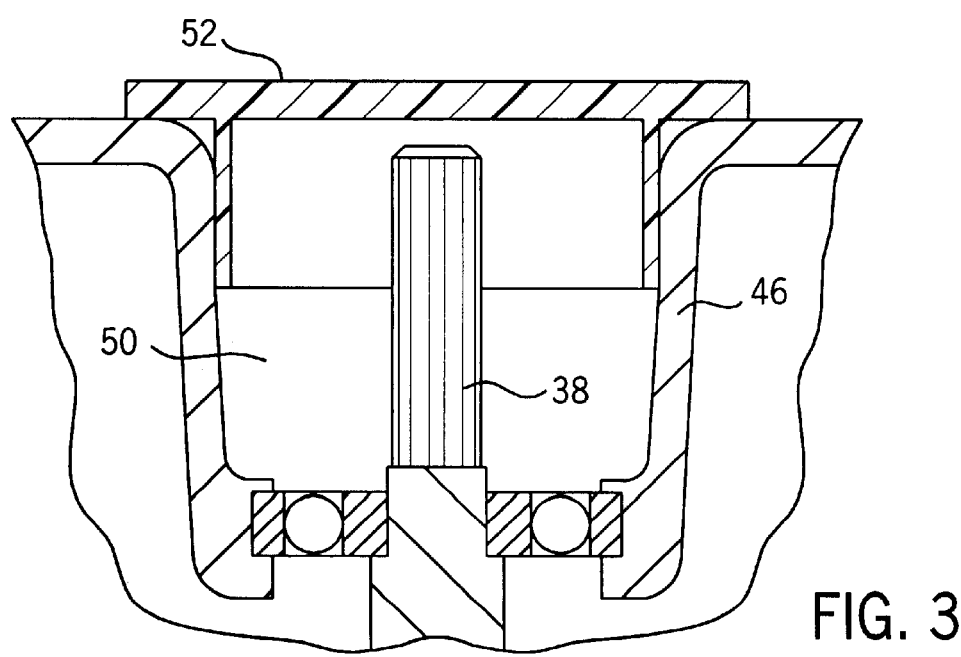
FIG. 3 illustrates a protective cap covering an exposed end of a shaft on the engine.

The tubular projection 46 forms a recess or well 50 extending from the exterior surface 51 of the adapter cover 44 toward the crankcase 20 and into which the splined shaft 38 of the crankshaft coupling 36 extends. Note that the end of the splined shaft 38 does not project outward from the well 50 above the uppermost part of that exterior surface 51. The adapter cover 44 thus shields the splined shaft 38 from inadvertent contact by the user of the power equipment on which the engine 14 is mounted. To further protect against inadvertent contact with the rotating end of the splined shaft 38, a cap 52 may be inserted over the open end of the well 50 of the adapter cover when an accessory device is not attached to the engine as shown in FIG. 3.

With reference again to FIG. 2, the accessory device 16 is mounted on the exterior surface 51 of the adapter cover 44. A drive shaft 54 for the accessory device extends downward into the well 50 and has a grooved aperture which receives the splined shaft 38 of the crankshaft coupling 36 to rotationally interlock the two shafts. This coupling of the splined shaft 38 to the drive shaft 54 transfers power from the engine 14 to the accessory device 16. In the exemplary accessory device 16, this coupling of the drive shaft 54 to the crankshaft coupling 36 drives the impeller of the pump thereby forcing fluid from the inlet hose 18 outward through the outlet hose 19.

The splined shaft 38 provides a coupling which enables the accessory device 16 to be easily removed from the engine 14, thereby restoring the lawnmower 10 to a state for mowing grass. This removability enables a variety of accessory devices to be interchangeably attached to the engine 14 to receive mechanical power. As used herein, "removable" means the ability to disconnect the accessory device from the engine without having to perform substantial or significant disassembly of the power equipment.

Figure 4:
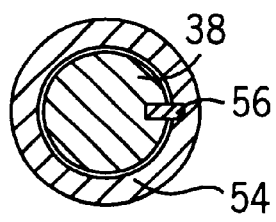
FIGS. 4–5 depict alternative mechanisms for rotationally connecting an accessory device to the upper end of the engine crankshaft.
Figure 5:
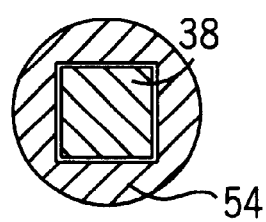
Figure 6:
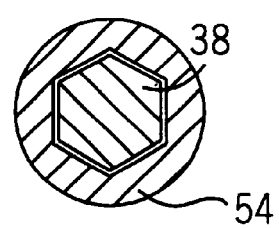
FIG. 6 is a partial cross-sectional view in which the coupling for the accessory device is integrated onto the crankshaft.

Although a spline coupling is illustrated in FIG. 2 to attach the shaft 38 of the crankshaft coupling 36 on the engine 14 to the drive shaft 54 of the accessory device 16, other types of couplings can be provided. For example, the respective shafts 38 and 54 could have keyways which receive a key 56 that rotationally locks the two shafts together as illustrated in FIG. 4. Alternatively the end of the crankshaft coupling shaft could have a square cross section that is received in a square aperture in the drive shaft 54 as shown in FIG. 5. Other polygonal cross sections can be used, such as the hexagon in FIG. 6.

Figure 7:
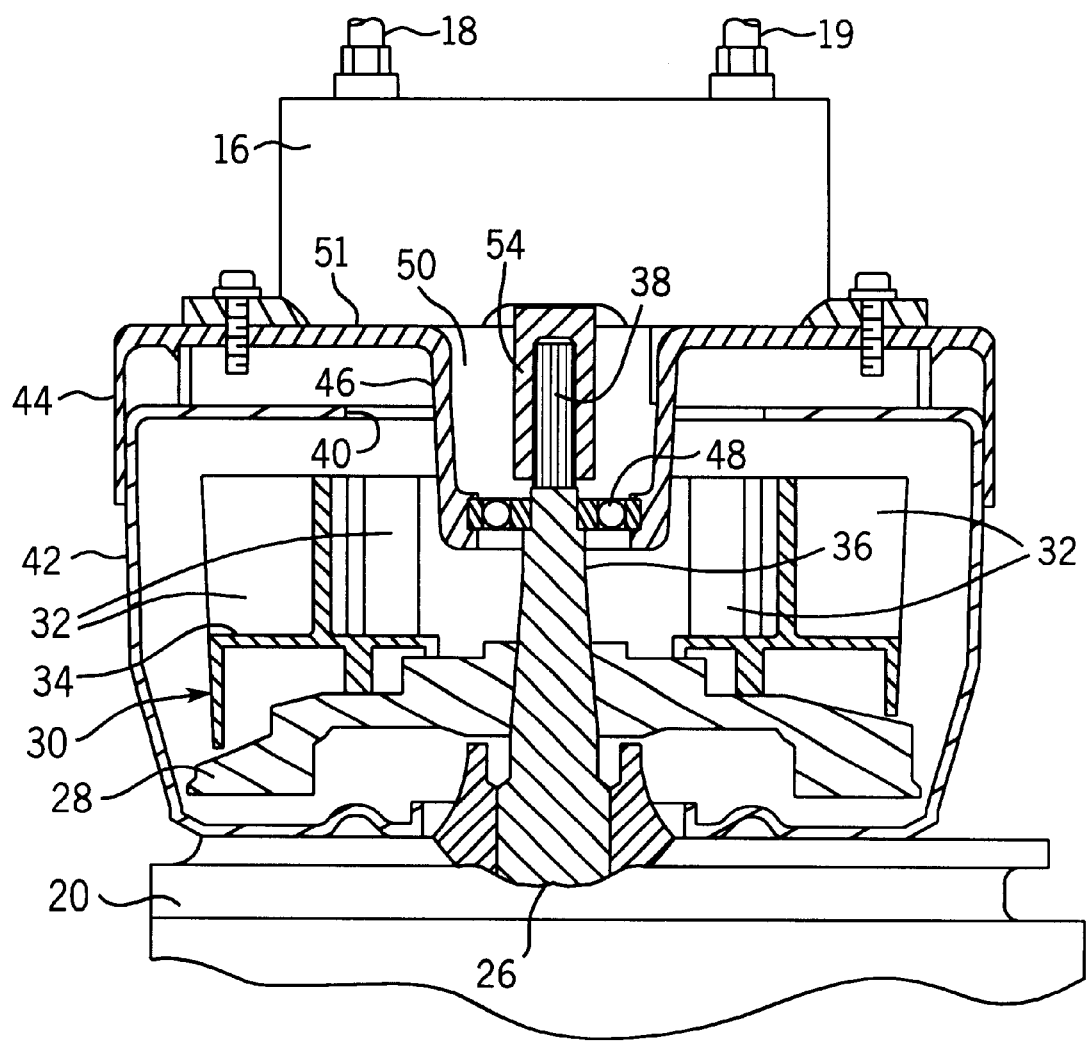
FIG. 7 shows a crankshaft coupling integrated into the upper end of the crankshaft.

With reference to FIG. 7, the crankshaft coupling 60 can be integrated into the upper end of the crankshaft 62. In this embodiment the coupling shaft 64 at that crankshaft end is shaped to rotationally engage the drive shaft 54 of the accessory device 16. For example, the coupling shaft 64 has splines that are received in matting grooves in an aperture of the drive shaft 54. As noted immediately above, other types of rotational couplings can be employed.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

I claim:

1. An internal combustion engine comprising:
   a crankcase having a top and a bottom; and
   a crankshaft mounted vertically in the crankcase and having a first end extending outward from the bottom of the crankcase for attachment to an implement to be driven by the engine, the crankshaft further having a coupling extending outward from the top of the crankcase for applying rotational power to an accessory device, wherein the coupling enables a user of the internal combustion engine to attach and detach the accessory device to and from the crankshaft.

2. The internal combustion engine recited in claim 1 wherein the coupling of the crankshaft comprises a splined shaft for engaging to the accessory device.

3. The internal combustion engine recited in claim 1 wherein the coupling of the crankshaft comprises shaft with a polygonal cross section for engaging to the accessory device.

4. The internal combustion engine recited in claim 1 wherein the coupling of the crankshaft comprises shaft with a keyway and a key that for engaging the accessory device.

5. The internal combustion engine recited in claim 1 wherein the coupling of the crankshaft comprises an adaptor connected to the crankshaft and having an element for engaging the accessory device.

6. The internal combustion engine recited in claim 1 further comprising a cover extending over the crankcase and having an exterior surface from which a well extends toward the crankcase, and the well having a bottom opening through which the coupling projects.

7. The internal combustion engine recited in claim 6 wherein the coupling does not extend outwardly beyond the exterior surface of the cover.

8. The internal combustion engine recited in claim 6 further comprising a cap which extends across the well adjacent to the exterior surface of the cover.

9. The internal combustion engine recited in claim 1 further comprising a stationary cap which shields the coupling from contact when an accessory device is not attached to the engine.

10. An internal combustion engine for applying power to an implement and to an accessory device, said internal combustion engine comprising:

a crankcase having a top and a bottom;

a crankshaft mounted vertically in the crankcase and having a first end extending outwardly from the bottom of the crankcase for attachment to the implement, the crankshaft having a second end extending outwardly from the top of the crankcase; and a coupling coupled to the second end of the crankshaft to engage and apply rotational power to the accessory device, wherein the coupling enables a user of the internal combustion engine to attach and detach the accessory device to and from the crankshaft.

11. The internal combustion engine recited in claim 10 further comprising a flywheel connected to the second end of the crankshaft.

12. The internal combustion engine recited in claim 11 wherein the coupling comprises an adaptor attached to the flywheel and having a shaft which mates with the accessory device.

13. The internal combustion engine recited in claim 10 wherein the coupling is integrated onto the second end so that the crankshaft and the coupling are formed as a single piece.

14. The internal combustion engine recited in claim 10 further comprising a cover extending over the top of the crankcase and having an exterior surface from which a well extends toward the crankcase, and coupling projecting into the well but does not extend outwardly beyond the exterior surface of the cover.

15. The internal combustion engine recited in claim 14 further comprising a cap which extends across the well adjacent to the exterior surface of the cover.

16. The internal combustion engine recited in claim 10 further comprising a stationary cap which shields the coupling from contact when an accessory device is not attached to the engine.

17. An internal combustion engine for applying power to an accessory device, said internal combustion engine comprising:

a crankcase having a top and a bottom;

a crankshaft mounted vertically in the crankcase and having a first end proximate to the bottom of the crankcase and having a second end extending outwardly from the top of the crankcase; and a coupling coupled to the second end of the crankshaft to engage the accessory device and apply rotational power to thereto and subsequently to be disengaged from the accessory device.

18. The internal combustion engine recited in claim 17 further comprising a flywheel connected to the second end of the crankshaft and wherein the coupling comprises an adaptor attached to the flywheel and having a shaft which mates with the accessory device.

19. The internal combustion engine recited in claim 17 wherein the coupling is integrated onto the second end so that the crankshaft and the coupling are formed as a single piece.

20. The internal combustion engine recited in claim 17 further comprising a cover extending over the top of the crankcase and having an exterior surface from which a well extends toward the crankcase, and coupling projecting into the well but does not extend outwardly beyond the exterior surface of the cover.

21. A powered apparatus comprising:

an internal combustion engine having a crankcase with a top and a bottom, and having a crankshaft mounted vertically in the crankcase, wherein the crankshaft has a first end proximate to the bottom of the crankcase and a second end extending outwardly from the top of the crankcase;

a coupling connected to the second end of the crankshaft; and an accessory device having a power input removably connected to the coupling to receive mechanical power from the internal combustion engine.

22. The powered apparatus recited in claim 21 further comprising a flywheel connected to the second end of the crankshaft, and wherein the coupling is attached to the flywheel and has a shaft which mates with the accessory device.

23. The powered apparatus recited in claim 21 wherein the coupling is integrated onto the second end so that the crankshaft and the coupling are formed as a single piece.

24. The powered apparatus recited in claim 21 further comprising a cover extending over the top of the crankcase and having an exterior surface from which a well extends toward the crankcase, and the well having a bottom opening through which the coupling projects, the coupling does not extend outwardly beyond the exterior surface of the cover.

25. The powered apparatus recited in claim 21 wherein the first end of the crankshaft extends outward from the bottom of the crankcase; and further comprises an implement attached to the first end of the crankshaft to be driven by the internal combustion engine.

26. The internal combustion engine recited in claim 1 wherein the coupling provides a mechanism which enables the accessory device to be detached from the crankshaft without affecting operation of the internal combustion engine.

27. The internal combustion engine recited in claim 10 wherein the coupling provides a mechanism which enables the accessory device to be detached from the crankshaft without affecting operation of the internal combustion engine.

28. The internal combustion engine recited in claim 17 wherein the coupling enables the accessory device to be removed without affecting operation of the internal combustion engine.

29. The internal combustion engine recited in claim 21 wherein the coupling provides a mechanism which enables the accessory device to be detached from the crankshaft without affecting operation of the internal combustion engine.

* * * * *